US009980348B2

(12) United States Patent
Chen

(10) Patent No.: US 9,980,348 B2
(45) Date of Patent: May 22, 2018

(54) SECURITY LIGHT WITH LIFESTYLE SOLUTIONS

(71) Applicant: Chia-Teh Chen, Taipei (TW)

(72) Inventor: Chia-Teh Chen, Taipei (TW)

( * ) Notice: Subject to any disclaimer, the term of this patent is extended or adjusted under 35 U.S.C. 154(b) by 0 days. days.

(21) Appl. No.: 15/646,620

(22) Filed: Jul. 11, 2017

(65) Prior Publication Data

US 2017/0318646 A1 Nov. 2, 2017

Related U.S. Application Data

(63) Continuation of application No. 15/415,964, filed on Jan. 26, 2017, now Pat. No. 9,743,495, which is a continuation of application No. 15/270,490, filed on Sep. 20, 2016, now Pat. No. 9,596,735, which is a continuation of application No. 15/131,448, filed on Apr. 18, 2016, now Pat. No. 9,480,129, which is a continuation of application No. 13/974,445, filed on Aug. 23, 2013, now Pat. No. 9,351,373.

(51) Int. Cl.
*H05B 37/02* (2006.01)
*H05B 33/08* (2006.01)
*G08B 5/36* (2006.01)

(52) U.S. Cl.
CPC ..... *H05B 37/0227* (2013.01); *H05B 33/0833* (2013.01); *H05B 37/0218* (2013.01); *H05B 37/0272* (2013.01); *H05B 37/0281* (2013.01); *G08B 5/36* (2013.01); *Y02B 20/40* (2013.01); *Y02B 20/42* (2013.01); *Y02B 20/46* (2013.01)

(58) Field of Classification Search
CPC ............... H05B 37/02; H05B 37/0218; H05B 37/0227; H05B 37/0272; H05B 37/0281; H05B 33/08; H05B 33/0833; H05B 5/36; Y02B 20/40; Y02B 20/42; Y02B 20/46
USPC .... 315/149, 151–159, 209 R, 291, 307, 308, 315/312
See application file for complete search history.

(56) References Cited

U.S. PATENT DOCUMENTS

2014/0103834 A1* 4/2014 Bockle ............... H05B 37/0263 315/291
2014/0252961 A1* 9/2014 Ramer ............... H05B 33/0842 315/151

* cited by examiner

*Primary Examiner* — Jimmy Vu
(74) *Attorney, Agent, or Firm* — Li & Cai Intellectual Property (USA) Office

(57) ABSTRACT

A lifestyle lighting solution using a controller with program codes for managing night time illumination is disclosed; wherein the night time illumination is divided into at least two illumination modes including a regular illumination mode for providing early evening illumination and an user friendly illumination mode for providing a mid night illumination with a soft on process to avoid or mitigate an eye irritating hardship. The conversion time point to switch from a regular illumination mode to an user friendly illumination mode is controlled by a timer configured in an external control device. The timer is programmed to operate one of three time setting methods including an anytime setting method, a fixed time point setting method and a fixed time period method.

70 Claims, 7 Drawing Sheets

SECURITY LIGHT WITH LIFESTYLE SOLUTIONS

CROSS-REFERENCE TO RELATED APPLICATIONS

This application is a continuation application of prior application Ser. No. 15/415,964 filed on Jan. 26, 2017, the entire contents of which are incorporated herein by reference. The application Ser. No. 15/415,964 is a continuation application of prior application Ser. No. 15/270,490 filed on Sep. 20, 2016. The application Ser. No. 15/270,490 is a continuation application of prior application Ser. No. 15/131,448 filed on Apr. 18, 2016. The application Ser. No. 15/131,448 is a continuation application of prior application Ser. No. 13/974,445 filed on Aug. 23, 2013, now U.S. Pat. No. 9,351,373 B2.

BACKGROUND OF THE INVENTION

1. Field of the Invention

The present invention relates to a management technology for operating lighting devices; in particular to some humanized techniques to perform a programmable delay time management and the application thereof.

2. Description of Related Art

The use of motion sensor to enable a lamp to perform a transient illumination is a well-known technology. Generally, there are two purposes for the need of a transient illumination by using a motion sensor. The first purpose is for energy saving wherein the light source is enabled only when the user enters the detection zone. The second purpose is for threatening intruders by using an instant extreme variation of luminance to achieve the objective of security guard. The drawback of the lighting device with the above-mentioned motion sensor is that the lighting device would keep in inactivated state and the environment would be dark when user is not in the detection range of the motion sensor. User is therefore not able to recognize the direction or the location of destination. In order to overcome the above-mentioned drawbacks, a lighting device with a motion sensor to perform two-level lighting was invented in U.S. Pat. No. 5,747,937 which enables a lamp to perform a low level illumination at nightfall and when a person or an animal enters the sensing range of the motion sensor the lamp is instantly activated to perform a high level illumination. Thus, when the user is outside the detection range, he or she can still see the ambient low level illumination to get a sense of direction or location of destination. Furthermore, a two-level security lighting device providing a timed illumination was invented in U.S. Pat. No. 7,339,471 B1 which enables a lamp at the onset of nightfall to perform an accent illumination for a time period and the lamp is illuminated at increased brightness when activated by a motion sensor, wherein the time length of the accent illumination can be automatically adjusted for different nighttimes due to seasonal effect when the lighting device is operated under a solar tracking mode.

The aforementioned two-level security lighting devices are a compromised solution between illumination need and security function throughout the night time. As a matter of fact and from the perspective of lifestyle living, the two-level security lamps in U.S. Pat. Nos. 5,747,937 and 7,339,471 B1 have ignored the different needs of illumination versus security function along the time frame during the night period. In early evening the general illumination is more needed than the security function, while in late evening the security function is more needed than the general illumination. The present invention is designed to offer an improvement over the drawback of the aforementioned two-level solutions, such that the lamp works as a general flood light with full illumination capacity for a preset time period in early evening when people are active before it is converted to a motion sensor activated security lighting in late evening when people are ready to go sleeping. Such hybrid configuration offers many choices of lifestyle lightings which optimizes the functional utilization of a lighting device for both general illumination and security guard during the course of nighttime period. This life style lighting solution would become even more meaningful with the increasing popularity of the LED bulbs which consumes very low energy at full-power illumination in early evening time and also serves perfectly as a security light to warn intruders in late evening time. Consumers will be pleased to see their outdoor space fully illuminated at low energy cost in the early evening time while enjoy or show off the beautiful and romantic scenery of their houses and landscapes. It is rather interesting to compare the present invention with LED bulbs to the two-level halogen security lamp per U.S. Pat. No. 5,747,937 which when operating at low level still consumes as much as 35 watts to 40 watts while our present invention consumes only 10 watts to 15 watts even at full-power illumination for the time period of early evening.

SUMMARY OF THE INVENTION

The objective of the present invention is to provide house owners a lifestyle lighting solution catering to their living habits. In the present invention a lighting device is provided, wherein the nighttime illumination of the lighting device is divided into two stages, with the first stage being a full-power illumination and the second stage being a power-saving/security illumination. The time point that the lighting device is changed from a full-power illumination to a power-saving illumination is the conversion time point, and such a conversion time point is creatively and uniquely designed to be programmable by the users according to their living needs. The technology also offers selection of different time periods for performing the full-power illumination before the lighting device being converted to the power-saving/security illumination.

In order to achieve the aforementioned objective, according to an embodiment of the present invention, a lighting device is provided which has two working modes selectable by the user, wherein the first working mode is a dusk-dawn mode, in which the lighting device is automatically turned on at dusk with a full-power illumination, and the same high level illumination continues until the lighting device is automatically turned off at dawn; wherein the second working mode is a lifestyle mode, in which the lighting device is automatically turned on at dusk to perform a full-power illumination for a preset time period and at a conversion time point the lighting device is switched from the full-power illumination to perform a power-saving illumination until daybreak. The time length of the preset time period is dependent on the conversion time point which is variable or programmable by appropriate means according to the user's need.

According to an embodiment of the present invention, a lighting device is constructed at least with a photo sensor, a motion sensor and a microcontroller such that the lighting device is automatically turned on at dusk and turned off at dawn by the photo sensor, wherein during the course of nighttime the lighting device performs two stages of illumination controlled by the microcontroller in such a manner that a timer embedded in the microcontroller is configured to set a conversion time point and to control a full-power illumination or high power illumination for a desired preset time period before being converted to a power-saving and security illumination in response to the motion sensor.

The present invention discloses a lifestyle lighting solution by configuring a timer in the microcontroller with at least three methods to set the conversion time point, which are:

(1) the anytime setting, in which the user selects a conversion time point for the lighting device by giving a trigger signal to the microcontroller, wherein the microcontroller recognizes the trigger signal and reacts at the moment of the selected time point by promptly converting the light performance from the full-power illumination to a power-saving or security illumination, and at the same time stores this selected time point in its memory for repetitive performance at this selected conversion time point on a daily basis until another trigger signal being given by the user to change the timer configuration;

(2) the fixed time point setting, in which the timer of the microcontroller is programmed to be capable of tracing the nighttime shift due to seasonal effect wherein the timer of the microcontroller dynamically controls the duration of the full-power illumination so that the lighting device can switch by itself at a fixed time point from the full-power illumination to a power-saving or security illumination;

(3) the fixed time period setting, in which the timer has a fixed time count so that the lighting device illuminates with full power for a constant time period before being converted to a power-saving or security illumination.

When the timer is configured by the fixed time point setting, the microcontroller with its program codes performs an automatic time shift detection to measure the seasonal time shift of dusk and dawn so as to dynamically adjust the time length of the preset time period for performing full-power illumination. Consequently, when the timer is configured to be compliant with seasonal time shift, the conversion time point is fixed to counteract the seasonal daytime variation. The advantage of the present invention is obvious. For instance, if in autumn season with sunset at 6 p.m., a house owner selects a three-hour period for performing a full-power illumination in early evening, the lighting device will be converted to a power-saving or security illumination year round at 9 p.m. which is a fixed conversion time point without being affected by the seasonal time shift of dusk and dawn. In the absence of such an automatic capability to detect seasonal time shift and when in winter season, the lighting device will be automatically turned on at around 4:30 p.m. (sunset time) and then be converted to a power-saving illumination at 7:30 p.m. which is too early according to our living habit. This automatic adjustment of the time period in performing full-power illumination also works well in extreme places like Greenland or Iceland.

The present invention discloses a security lighting device which provides at least the following variations to perform the second stage or security illumination after the conversion time point, which are:

(1) Complete cutoff; the lighting device is turned off completely at the conversion time point through the rest of nighttime and at dawn the lighting device is reset to enter a new cycle of repetitive performance. Thus, at dusk the lighting device is again turned on automatically to perform a full-power illumination for a preset time period and at the same conversion time point is again turned off completely accordingly.

(2) Low level illumination; the lighting device is switched to a low level illumination throughout the rest of nighttime. At dawn the lighting device is turned off and reset to enter a new cycle of repetitive performance. Thus, at dusk the lighting device is again automatically turned on to perform a full-power illumination and continues until reaching the same conversion time point at which the lighting device is switched to a low level illumination accordingly.

(3) Complete cutoff coupled with motion sensor activated illumination; the lighting device is switched to complete cutoff at the conversion time point and at the same time enters a standby status to await the detection signal from the motion sensor. When a body motion is detected, the motion sensor activates the lighting device to perform a full-power illumination only for a short time period until the motion detection signal disappears. At dawn the lighting device is reset to enter a new cycle of repetitive performance. Thus, at dusk the lighting device is automatically turned on and continues until reaching the conversion time point at which the lighting device is switched to complete cutoff and enters a standby status to await the detection signal from the motion sensor accordingly.

(4) Low level illumination coupled with motion sensor activated illumination; at the conversion time point the lighting device is switched to a low level illumination and at the same time enters a standby status to await the detection signal from the motion sensor. Whenever a body motion is detected, the motion sensor activates the lighting device to perform a full-power illumination only for a short time period until the motion detection signal disappears. At dawn the lighting device is reset to enter a new cycle of repetitive performance. Thus, at dusk the lighting device is automatically turned on for a full-power illumination and continues until reaching the conversion time point at which the lighting device is switched to a low level illumination and enters a standby status to await the detection signal from the motion sensor accordingly.

To make the lighting device of the present invention even more user friendly, the present invention also provides home owners additional solution of being able to choose different working modes designed in at different time or on different occasions. For example, in a multi-mode lighting device wherein two or three working modes are built into one single lighting device using the microcontroller technology, the user can select one of the multi-modes for performance by using a control signal to alternately change the working mode or using control signals of different format and different binary patterns to activate corresponding working modes. The multi-modes always includes a basic dusk-dawn mode and the above mentioned lifestyle security modes for user's selection and the high power illumination mode.

The present invention further provides a lighting device constructed with a motion sensor and a microcontroller such that instead of using a photo sensor the lighting device is automatically turned on at dusk and turned off at dawn by the program codes of the microcontroller, wherein during the course of nighttime the lighting device has at least two working modes selectable by the users. In order to perform the aforementioned lifestyle mode without using photo sensor, the user takes an initial setting process to input at least three time parameters to the microcontroller, namely a first preset time point to turn on the lighting device for a full-power illumination, a second preset time point to convert to power-saving/security illumination which being coupled with the motion sensor and a third preset time point to turn off the lighting device and at the same time to reset the microcontroller for the next 24 hours performance cycle. Such lifestyle mode without reliance on a photo sensor enables the users to manage their time table of lighting performance for both indoor and outdoor applications.

The light sources of the present invention can be incandescent lamps, fluorescent lamps, AC LED modules or DC LED bulbs. According to the embodiments of the present invention, the two-level illumination performance can be achieved either by dimming a single light source load or by using a double-load construction with a low-wattage and a high-wattage light source load such that the high-wattage light source load is always activated by the motion sensor and the low-wattage light source load is automatically turned on and off with or without the photo sensor. The lighting device with lifestyle illumination management is therefore different from the dusk to dawn lighting devices and the traditional motion sensor activated security lighting apparatuses. The present invention offers a versatile solution to users to manage their night illumination according to their life styles and living habits.

To sum up, the lighting device with programmable timer technology to dynamically control full-power illumination and power-saving illumination provided in an embodiment of the present invention integrates multi luminance functions into one single construction without resorting to complex hardware, wherein design concept with humanized considerations is adopted.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
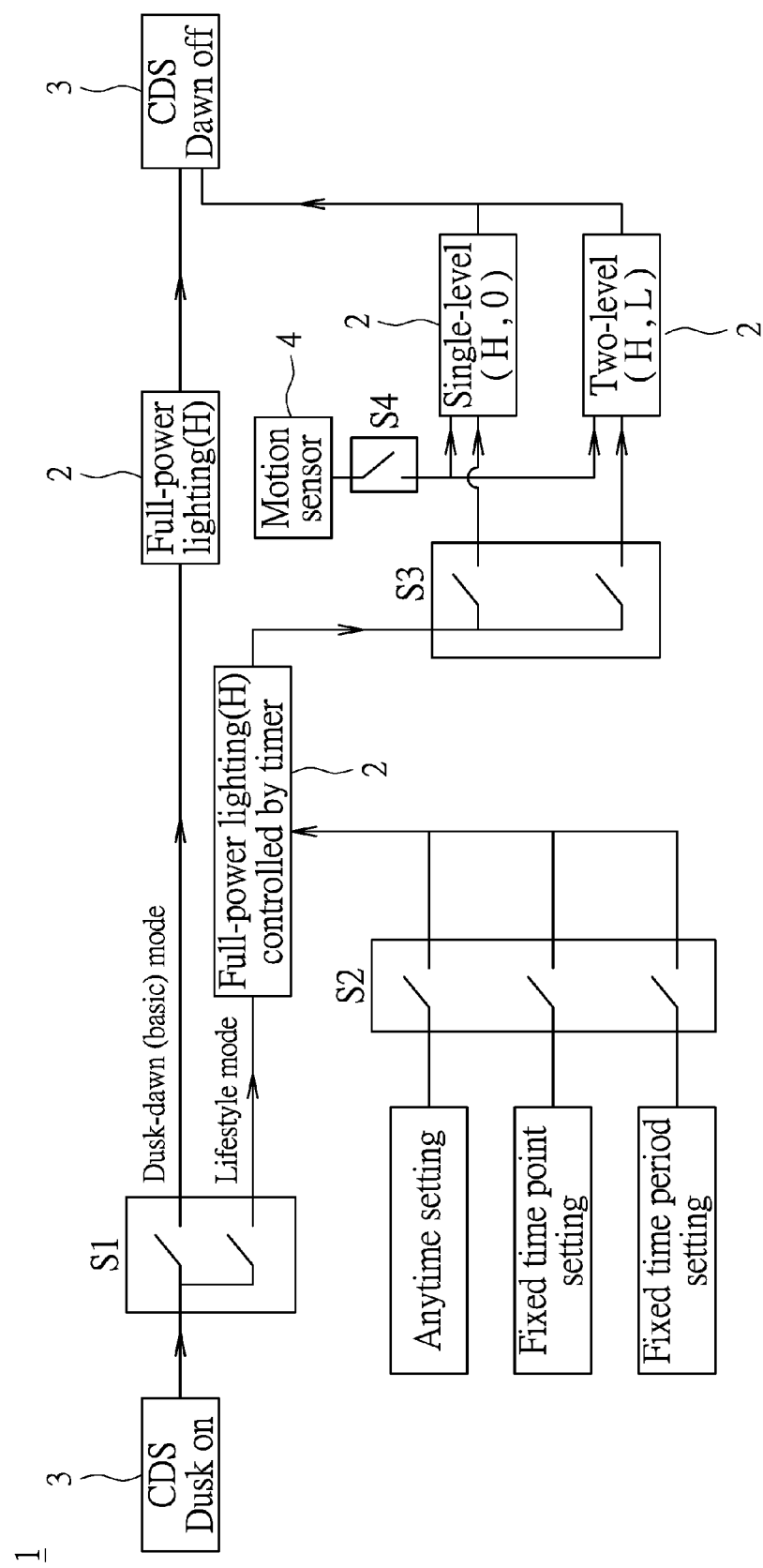
FIG. 1 schematically shows a block diagram depicting the operation principle of the lifestyle lighting device according to various embodiments of the present invention.

FIG. 1 shows a block diagram depicting the operation principle of a lifestyle lighting device according to various embodiments of the present invention. Referring to FIG. 1, a lighting device 1 of the present invention is composed basically of a controller unit 2, functional selection switches S1-S4 and sensor elements 3, 4, together with light source loads and electric power unit not depicted here. As a basic operation, a lighting device 1 is enabled at dusk and disabled at dawn by using a photo sensor (CDS) 3 to detect daylight and to control electric power supply to the lighting device 1. This basic operation is referred to as dusk-dawn mode. According to FIG. 1, the lighting device 1 includes a dusk-dawn mode and a lifestyle mode, wherein a mode selection switch S1 is provided in the lighting device 1 to choose different operation mode.

When operating S1 to select the dusk-dawn mode, the lighting device 1 is turned on automatically at dusk to perform a full-power illumination or high power illumination controlled by the controller unit 2, and the same high level illumination continues until the lighting device 1 is automatically turned off at dawn, and the lighting device 1 is reset to enter a new operation cycle on a daily basis; by operating S1 to select the lifestyle mode, the lighting device 1 is turned on automatically at dusk to perform a full-power illumination for a preset time period until reaching a conversion time point, at which the lighting device 1 is converted to a power-saving or security illumination controlled by the controller unit 2, and the security illumination continues until the lighting device 1 is automatically turned off at dawn, and the lighting device 1 is reset to enter a new operation cycle on a daily basis.

The lifestyle mode is characterized by a full-power illumination lasting for a preset time period which is measured between the turn-on time point of the lighting device at dusk and the conversion time point controlled by a virtual timer in the controller unit 2. Referring to FIG. 1, a functional switch S2 is provided in the lighting device 1 in order to set the conversion time point or the preset time period by at least three methods, which are: (1) the anytime setting, for selecting an arbitrary conversion time point by the user; (2) the fixed time point setting, for enabling the lighting device 1 to have a conversion time point without being affected by seasonal effect; and (3) the fixed time period setting, for selecting a constant time period. More details regarding each setting method will be described later with the help of circuit diagrams. In short, the illumination performance of the lifestyle lighting device 1 during the course of nighttime is divided by a conversion time point into two stages, with the first stage being a full-power illumination and the second stage being a power-saving or security illumination controlled by the controller unit 2. The conversion time point which is dynamically variable or programmable according to the user's demand is the key technology for the lifestyle lighting solutions.

The lighting device 1 furthermore provides four options for the second stage power-saving or security illumination in order to extend its utility. As depicted in FIG. 1, a functional switch S3 is introduced for this purpose. The lighting device 1 can perform at the second stage with one of the two illumination types selectable by operating a functional switch S3, which are:

(1) Complete cutoff (0), wherein at the conversion time point the lighting device 1 is turned off completely through the rest of nighttime. At dawn, the lighting device 1 is reset to enter a new cycle of repetitive performance;

(2) Low level illumination (L), wherein at the conversion time point the lighting device 1 is switched to perform a low level illumination, generally at 30% or less of the full-power illumination. The low level illumination continues through the rest of nighttime. At dawn, the lighting device 1 is reset to enter a new cycle of repetitive performance.

Moreover, referring to FIG. 1, a functional switch S4 is connected to a motion sensor 4. When the switch S4 is short-circuited, the motion sensor 4 is coupled to the controller unit 2 and the lighting device 1 can perform at the second stage with one of the other two illumination types selectable by operating the switch S3 as depicted in FIG. 1, which are:

(3) Complete cutoff coupled with motion sensor activated illumination (H,0), wherein the lighting device 1 is turned off completely at the conversion time point and at the same time enters a standby status to await the detection signal from the motion sensor 4. When a body motion is detected, the lighting device 1 reacts by changing its illumination from off-state (0) to a full-power illumination (H) for a short time period and then returns to the standby status with a complete off state. This illumination type is also referred to as a motion sensor activated single-level illumination which continues until dawn. At dawn, the lighting device 1 is reset to enter a new cycle of repetitive performance;

(4) Low level coupled with motion sensor activated illumination (H,L), wherein at the conversion time point the lighting device 1 is switched to perform a low level illumination, generally at 30% or less of the full-power illumination, and at the same time enters a standby status to await the detection signal from the motion sensor 4. When a body motion is detected, the lighting device 1 reacts by changing its performance from a low level illumination (L) to a full-power illumination (H) for a short time period and then returns to the standby status with a low level illumination. This illumination type is also referred to as a motion sensor activated two-level illumination which continues until dawn. At dawn, the lighting device 1 is reset to enter a new cycle of repetitive performance.

Based on the operation principle depicted in FIG. 1, the lighting device 1 of the present invention has three variations in time period setting for performing the full-power illumination and four variations in illumination types of the power-saving or security illumination. The lighting device 1 offers therefore twelve different combinations of lifestyle lighting solutions or lifestyle lighting management for indoor and outdoor applications. It provides flexibility for designing lifestyle solutions by combining an appropriate numbers of the aforementioned variations into a lighting device. For instance, a lighting device can be so constructed without a photo sensor such that it is turned on manually by operating a wall switch, performs at the first stage a full-power illumination for a fixed time period and then at the second stage a motion sensor activated single-level illumination.

Referring to FIG. 1, according to various embodiments of the present invention, the operation of the lighting device 1 is automatically conducted by the controller unit 2 in response to the sensor elements 3,4 to perform a lifestyle illumination which is divided into two stages during the course of entire nighttime. The controller unit 2 is responsible for a lifestyle solution wherein parameters for different timed illuminations are preset and programmed through the functional selection switches S1-S4 which are also referred to as external control units or external control means. In practice, the controller unit 2 has an internal timer circuit to perform different timed illuminations. The external control units S1-S4 can be constructed in form of electronic or mechanical means to generate external control signals to perform function selection or timer setting for the controller unit's operation, wherein the external control signals can be in form of constant voltage or a binary voltage signal with a low and a high voltage recognizable by the controller unit 2 to change the working mode or to activate corresponding timer circuit setting.

Figure 2:
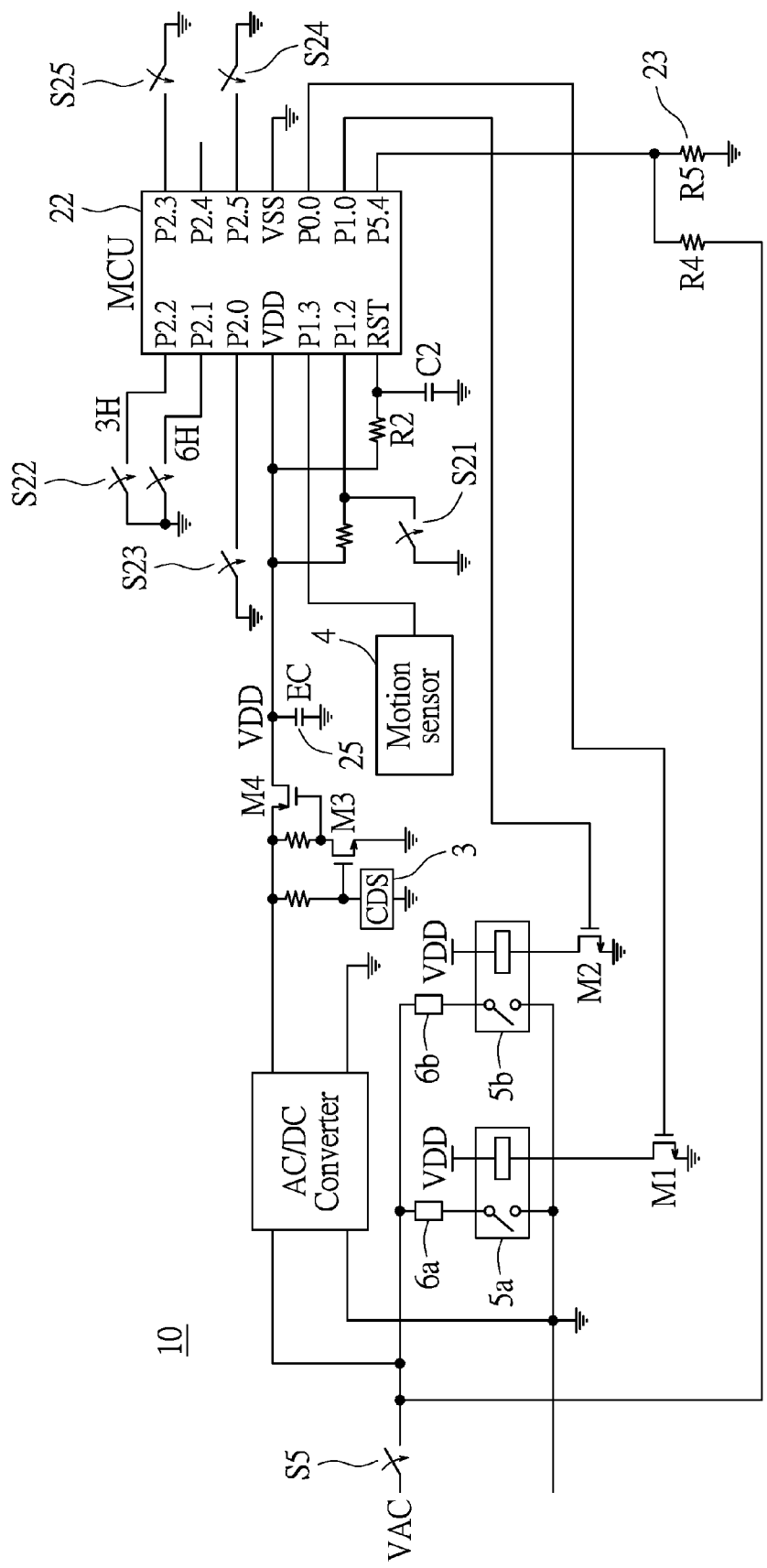
FIG. 2 schematically shows a circuit diagram depicting the lighting device to perform lifestyle lighting by controlling relays to transmit electric power to two light source loads according to an embodiment of the present invention.

Referring to FIG. 1 and FIG. 2, FIG. 2 shows schematically a circuit diagram for technically implementing a lighting device 1 according to FIG. 1 of an embodiment of the present invention. In FIG. 2, a conventional AC/DC converter generates a DC voltage VDD as the working voltage for the lighting device 10. A photo sensor CDS 3 is provided to detect daylight and to control the supply of VDD to the lighting device 10. In the daytime, because the photo sensor 3 has a small resistance, the NMOS transistor M3 is turned off and simultaneously the PMOS transistor M4 is turned off completely to prohibit supplying VDD to the lighting device 10. In the nighttime, because the photo sensor 3 has a large resistance, the NMOS transistor M3 is turned on and simultaneously the PMOS transistor M4 is turned on heavily to supply VDD to the lighting device 10. Therefore, the lighting device 10 is automatically enabled at dusk and disabled at dawn by the photo sensor 3. At dusk the lighting devices 10 begins to work. Referring to FIG. 2, the lighting device 10 has a microcontroller 22 as the controller unit 2 to control the electric conduction state of the relay modules 5*a*, 5*b* for transmitting electric power to the light source loads 6*a*, 6*b*, respectively. The microcontroller 22 incorporating a photo sensor 3 and a motion sensor 4 controls the illumination of the light source loads 6*a*, 6*b* to perform one of two working modes, which are dusk-dawn mode and lifestyle mode. In the lifestyle mode the microcontroller 22 performs illumination divided into two stages according to proper settings of a delay timer in the microcontroller.

In the following, the description is referred to the lighting device 10 being enabled by the photo sensor 3 through the entire nighttime. Referring to FIG. 2, the microcontroller 22 has the connection pins P0.0-P5.4 as input and output ports respectively to receive external control signals from the external control means S21-S25 and to deliver control voltages to a controllable switching unit consisting of the relay modules 5*a*, 5*b* to transmit electric power to the light source loads 6*a*, 6*b*.

Refer to FIG. 1 and FIG. 2. In FIG. 2, the working mode selection is done by operating the external control means S21 which, for instance, is a toggle switch with one end connected to the ground and with another end via a resistor connected to VDD and also connected directly with the pin P1.2 of the microcontroller 22. By short-circuiting S21 a zero voltage signal appears at P1.2, otherwise the pin P1.2 is held at a high voltage. The microcontroller 22 with its program codes scans constantly the electric potential at P1.2 for working mode decision. If a zero voltage is detected at P1.2, for instance, it is interpreted by the microcontroller 22 as an external control signal for dusk-dawn mode. The microcontroller 22 runs in response to the external control signal a subprogram to execute the dusk-dawn mode. At the dusk-dawn mode, the microcontroller 22 delivers automatically at nightfall through its two pins P0.0 and P1.0 a high voltage to turn on the NMOS transistors M1 and M2, wherein the two relay modules 5a,5b are short-circuited to transmit electric power to the two light source load 6a,6b such as to perform a full-power illumination; the full-power illumination is sustained by a high voltage at the pins P0.0 and P1.0 until daybreak when the working voltage VDD is cutoff by the photo sensor 3, wherein the microcontroller 22 is reset to enter a next operating cycle on a daily basis. The pin RST connected with resistor/capacitor R2/C2 is reserved for power reset when the microcontroller 22 starts its program on next day.

Referring to FIG. 2, the microcontroller 22 with its program codes scans the electric potential at P1.2 for working mode decision. If a high voltage is detected at P1.2, for instance, it is interpreted by the microcontroller as an external control signal for lifestyle mode. The microcontroller runs in response to the external control signal a subprogram to execute the lifestyle mode. In the lifestyle mode, the microcontroller 22 delivers automatically at nightfall through its two pins P0.0 and P1.0 a high voltage to turn on the transistors M1 and M2 and also simultaneously the two relay modules 5a,5b, wherein the two light source load 6a,6b are turned on to deliver a full-power illumination; the high voltage at the pins P0.0 and P1.0 is sustained for a preset time period controlled by a timer embedded in the microcontroller 22 until reaching a conversion time point, at which the microcontroller 22 with the pin P1.0 remaining at a high voltage, for instance, delivers however a zero voltage to the pin P0.0 to turn off the NMOS transistor M1 and hence also to turn off the corresponding light source load 6a, such that the lighting device 10 has its luminance changed from a full-power intensity to a lower power intensity which is referred as a power-saving illumination; the power-saving illumination continues until daybreak when the working voltage VDD is cutoff by the photo sensor 3, wherein the microcontroller 22 is reset to enter next operating cycle.

As mentioned previously, the lighting device with lifestyle solutions is characterized by a proper conversion time point or a proper preset time period for performing full-power illumination catering to user's living habits. Referring to FIG. 2, the microcontroller 22 has pins reserved for connecting with the external control means S22,S23 and 23 to receive external control signals or trigger signals for selecting method to set the conversion time point or the time period for performing full-power illumination, wherein the setting is made through configuring a virtual timer which is based on executing a long delay time subroutine of the microcontroller program codes or by using auxiliary counter for long time counting. For the lifestyle mode, the timer in the microcontroller 22 can be configured by at least three methods which are:

(1) the anytime setting,
(2) the fixed time point setting, and
(3) the fixed time period setting.

The anytime setting can be done, for instance, in a convenient way by manually operating a wall switch or a main power switch at any clock time when the user wants to choose a desired conversion time point, for instance, going to sleep. Referring to FIG. 2, a main power switch S5 connected between the lighting device 10 and an AC power VAC is used to do the anytime setting. To detect the anytime setting, a sampling circuit 23 consisting of resistors R4 and R5 is connected with one AC power line, wherein the sampling output is connected to a pin P5.4 of the microcontroller 22. When the AC power is shut down by operating the main switch S5, a zero voltage appears at the sampling circuit 23 and hence also at the pin P5.4. In FIG. 2, a large capacitor EC 25 is provided to hold VDD voltage for keeping the microcontroller 22 still in operation when the AC power is turned off momentarily. The anytime setting is accomplished when the user turns off momentarily and within a preset instant time interval, for instance, 1~2 seconds, turns back on the power switch S5 at a selected time point. If the microcontroller 22 with program codes scans constantly the electric potential at pins and detects at the pin P5.4 momentarily a zero voltage caused by this electric power disruption event, the microcontroller 22 recognizes it as an external trigger signal for the anytime setting. The microcontroller 22 reacts at the moment of receiving the trigger signal by promptly converting the lighting performance from a full-power illumination to a power-saving illumination and at the same time stores the selected time point information into its memory. The time point of the anytime setting serves as a new conversion time point for repetitive performance on a daily basis until another trigger signal or external control signal being received by the microcontroller.

Besides the aforementioned electric power disruption method, the anytime setting can also be done by operating an external control means, for instance, a toggle switch, which is connected between the ground and a pin of the microcontroller, not shown in FIG. 2. The anytime setting is triggered by the user at a desired conversion time point by momentarily short-circuiting the toggle switch, wherein a short-duration zero voltage appears at the pin of the microcontroller. At the moment when the user operates the toggle switch for the anytime setting by short-circuiting it and within a short time restoring it to open-circuit, the microcontroller 22 with program codes detects therefore at the pin connected with this toggle switch an instant zero voltage wherein the microcontroller 22 recognizes it as an external trigger signal for the anytime setting and reacts at the time point of receiving the trigger signal by promptly converting the lighting performance to a power-saving illumination and at the same time stores the selected time point information into its memory for repetitive performance on a 24-hours basis, as afore described.

The fixed time point setting is done by engaging an external control means connected to the microcontroller. Referring to FIG. 2, a toggle switch S23, for instance, serves as an external control means which is connected between one pin P2.0 of the microcontroller 22 and the ground. The fixed time point setting is selected by short-circuiting the switch S23, wherein a zero voltage appears at the pin P2.0. The microcontroller 22 with program codes scans constantly the electric potential at pins. If a zero voltage is detected at the pin P2.0, the microcontroller 22 interprets it as an external control signal for the fixed time point setting, wherein the microcontroller 22 runs a subroutine of the program codes to count a time delay $t_D$ for performing the full-power illumination, such that $$t_D = t_o + (T-12)/2,$$

where $t_o$ is a constant in the subroutine, representing one of time lengths selectable to the users as the basis for making seasonal shift adjustment, T is a mean value of night time lengths collected from measurement of at least three consecutive days with the help of photo sensor 3 and processed by the program codes of the microcontroller. The fixed time point setting is valid for repetitively performing the lifestyle mode on a daily basis until other setting method is done by engaging proper external control means.

The fixed time point setting enables the microcontroller with its program codes to counteract the seasonal time shift of dusk and dawn so as to dynamically adjust the time length of the preset time period for performing a full-power illumination. For instance, a three-hour time period is normally preset in the subroutine, for which the constant $t_o=3$. If in spring season with sunset at 6 p.m., then T=12 for the nighttime, the lighting device will be converted to a power-saving or security illumination at 9 p.m. which is a conversion time point without being affected by the seasonal time shift of dusk and dawn. With the fixed time point setting, if in summer season with sunset at 8 p.m., then T=8 for the nighttime, $t_D=3+(-2)=1$, the lighting device will be converted to a power-saving or security illumination at 8 p.m.+$t_D$=9 p.m.; if in winter season with sunset at 4 p.m., then T=16 for the nighttime, $t_D=3+(2)=5$, the lighting device will be converted to a power-saving or security illumination at 4 p.m.+$t_D$=9 p.m. Consequently, when the timer program of the microcontroller is configured to be compliant with seasonal time shift, the conversion time point is fixed despite the seasonal daytime variation. This fixed time point setting is different from the method used in the prior art U.S. Pat. No. 7,339,471 B1 where the duration of illumination is determined based on a predetermined fraction of the recorded length of nighttime from previous night and consequently the time point of conversion may change during different seasons.

The fixed time period setting is done by engaging external control means connected to the microcontroller. Referring to FIG. 2, two toggle switches S22 serves as external control means which are respectively connected to pins P2.1 and P2.2 of the microcontroller 22 and the ground, for respectively setting 6-hour (6H) and 3-hour (3H) time period. The fixed time period setting is selected by short-circuiting one switch, for instance, the switch 6H, wherein a zero voltage appears at the pin P2.1. The microcontroller 22 with program codes scans constantly the electric potential at pins. If a zero voltage is detected at the pin P2.1, the microcontroller 22 interprets it as an external control signal for the fixed time period setting, wherein the microcontroller 22 runs a subroutine of the program codes to count a time period of 6 hours, such that the full-power illumination continues 6 hours before the lighting device 1 being converted to a power-saving illumination. By analogy, if a zero voltage is detected at the pin P2.2 when the toggle switch 3H is short-circuited, the microcontroller 22 runs a 3-hour delay time subroutine to enable a full-power illumination for 3 hours. The fixed time period setting is valid for repetitively performing the lifestyle mode on a daily basis until other setting method is done by engaging proper external control unit.

Refer to FIG. 1 and FIG. 2. In FIG. 2, when the lighting device 10 operates in the lifestyle mode by open-circuiting the mode selection switch S21, the illumination of the lighting device 10 is divided by a conversion time point into two stages, with the first stage being a full-power illumination and the second stage being a power-saving illumination. To make the security light versatile, the lighting device 10 of the present disclosure furthermore provides four options for the second stage energy-saving illumination by modifying the microcontroller program codes to take account additional external control signals which will be described as follows.

The four options at the second stage illumination can be done by using two light source loads 6a, 6b of different power levels and incorporating with a motion sensor 4. For instance, the load 6a is a high-wattage light source and 6b is a low-wattage one. In FIG. 2, a motion sensor 4 is connected to the pin P1.3 of the microcontroller 22. In addition, two toggle switches S24, S25 serve as external control means to make four different illumination types selectable by generating control signals respectively sent to the pins P2.3 and P2.5 of the microcontroller 22. The external control means S24, S25 can be so designed, for instance, S24 controls the coupling between the microcontroller 22 and the motion sensor 4, and S25 controls the illumination level of the lighting device. As depicted in FIG. 2, when a toggle switch S24, S25 is closed or short-circuited, a zero voltage appears at the corresponding pin which can be recognized and interpreted by the microcontroller 22 as external control signal to execute a corresponding illumination type. By operating the external control means S24, S25 properly, the microcontroller generates with program codes, either reacting to or disabling the motion sensor 4, a zero or a VDD voltage at the pins P0.0 and P1.0 respectively to control the luminance of the two light source loads 6a, 6b. The luminance intensity of the lighting device 10 is controlled by the electric voltages at the pins P0.0 and P1.0, for instance: With zero voltage at both P0.0 and P1.0 is a darkness state(0); with zero voltage at P0.0 and VDD at P1.0 is a low level illumination (L); with VDD at both P0.0 and P1.0 is a high level or full-power illumination (H).

Referring FIG. 2, incorporating with the external control means S24, S25 and the motion sensor 4, the microcontroller 22 runs subroutines in response to the external control signals for the second stage power-saving illumination, which are:

(1) Complete cutoff (0), for instance, by opening both the switch S24 and S25, wherein the second stage illumination is darkness (0) by disabling the motion sensor 4 throughout the rest of nighttime;

(2) Low level illumination (L), for instance, by opening the switch S24 and by closing the switch S25, wherein the second stage is a low-level illumination and disabling the motion sensor 4 throughout the rest of nighttime;

(3) Single-level illumination coupled with motion sensor (H,0), for instance, by closing the switch S24 and by opening the switch S25, wherein the illumination is changed from darkness (0) to a high-intensity brightness (H) in response to the motion detection signal;

(4) Two-level illumination coupled with motion sensor (H,L), for instance, by closing both the switch S24 and S25, wherein the illumination is changed from a low(L)- to a high(H)-intensity luminance in response to the motion detection signal.

In view of FIG. 2, the light source loads 6a, 6b can be incandescent lamps, fluorescent lamps, AC LED modules or LED bulbs which are connected via relays 5a, 5b to an AC power. FIG. 2 depicts schematically a lifestyle lighting device 10 which performs two-level illumination based on a double-light source load structure comprising a low-wattage and a high-wattage light source load such that the high-wattage light source load 6a is activated by the motion sensor 4 and the low-wattage light source load 6b is automatically turned on and off by the photo sensor 3. In fact, there is no restriction imposed on the type and the number of the light source loads. The operation principle of a lifestyle lighting device according to FIG. 1 can be equally applied to a single light source load, driven either by DC power or AC power, wherein the lighting device performs a two-level illumination at the second stage by dimming technique which will be described as follows.

Figure 3:
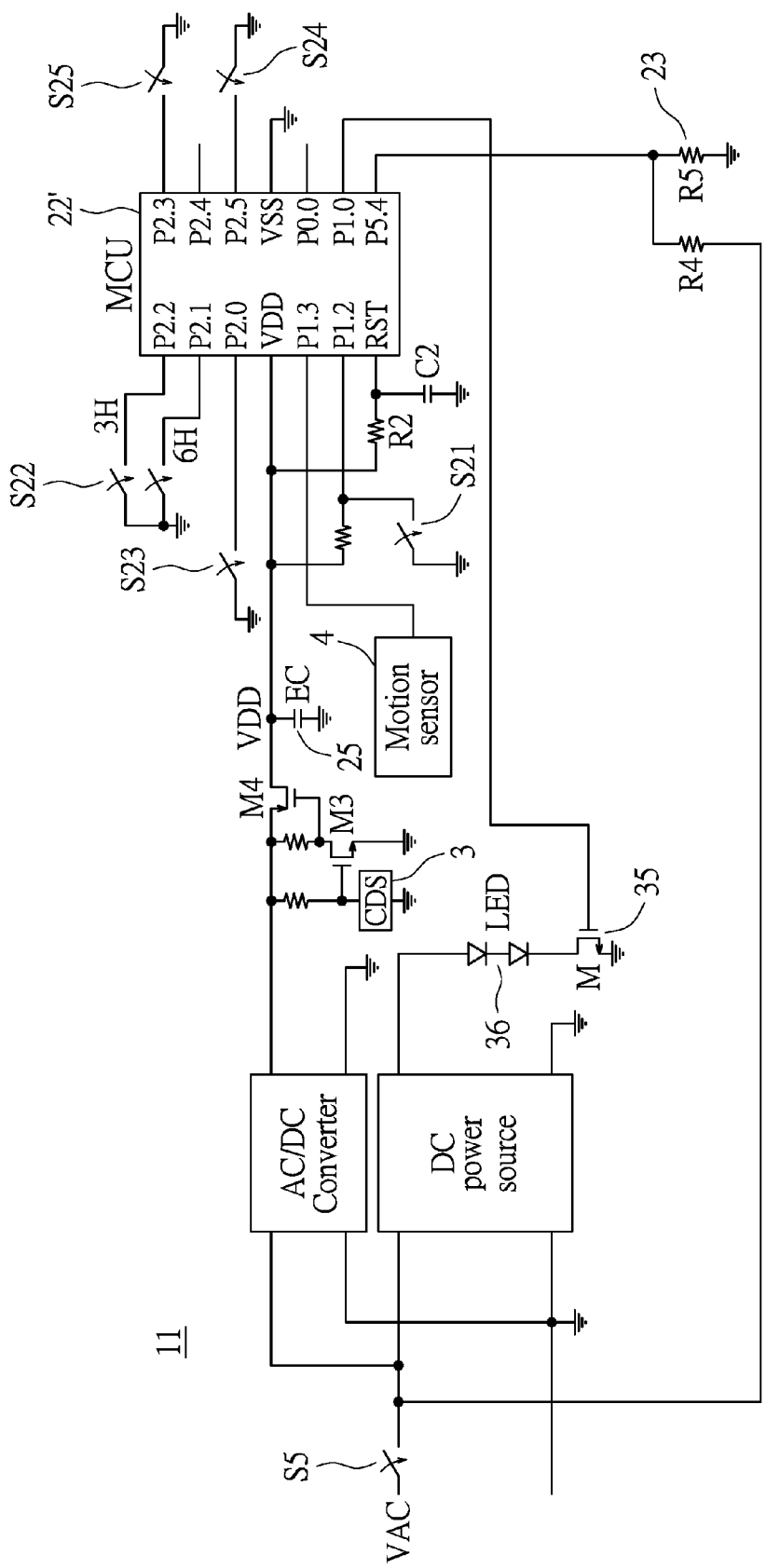
FIG. 3 schematically shows a circuit diagram depicting the lighting device to perform lifestyle lighting by controlling the conduction state of a unidirectional controllable switching unit according to an embodiment of the present invention.

Referring to FIG. 3, according to an embodiment of the present disclosure, the lighting device 11 is equipped with a light-emitting diode (LED) module 36 connected in series with a NMOS transistor M 35 and a DC power source. Comparing with the embodiment of the present disclosure depicted in FIG. 2, the LED module 36 is a single light source load and the transistor M 35 is a unidirectional controllable switching unit. Besides the difference in light source structure and driving power source, the lighting devices 11 adopts the same controller structure including a photo sensor 3 and a motion sensor 4 as shown in FIG. 2. In FIG. 3, the microcontroller 22' runs programs in response to the external control signals or trigger signals generated from the external control means S21-S25, 23,S5 in the same manner as described for the circuit diagram sketched in FIG. 2.

Refer to FIG. 3. By operating the control unit S21 to select the working mode, the lighting device 11 performs dusk-dawn mode and lifestyle mode, respectively, through the luminance control of the LED module 36. In the lifestyle mode the lighting device 11 performs the full-power illumination for a preset time period and is converted into the power-saving illumination at a conversion time point controlled by a delay timer in the microcontroller 22'. By operating the control means S22, S23, S5 properly, the delay timer of the microcontroller 22' is configured by one of the three setting methods, which are the anytime setting, the fixed time point setting and the fixed time period setting, in order to execute the corresponding delay time subroutines. Furthermore, by operating the external control means S24, S25 properly, the lighting device 11 performs the energy-saving or security illumination at the second stage to generate one of four different illumination types which are complete darkness, low-power illumination, motion sensor activated single-level and two-level illumination.

Figure 3A:
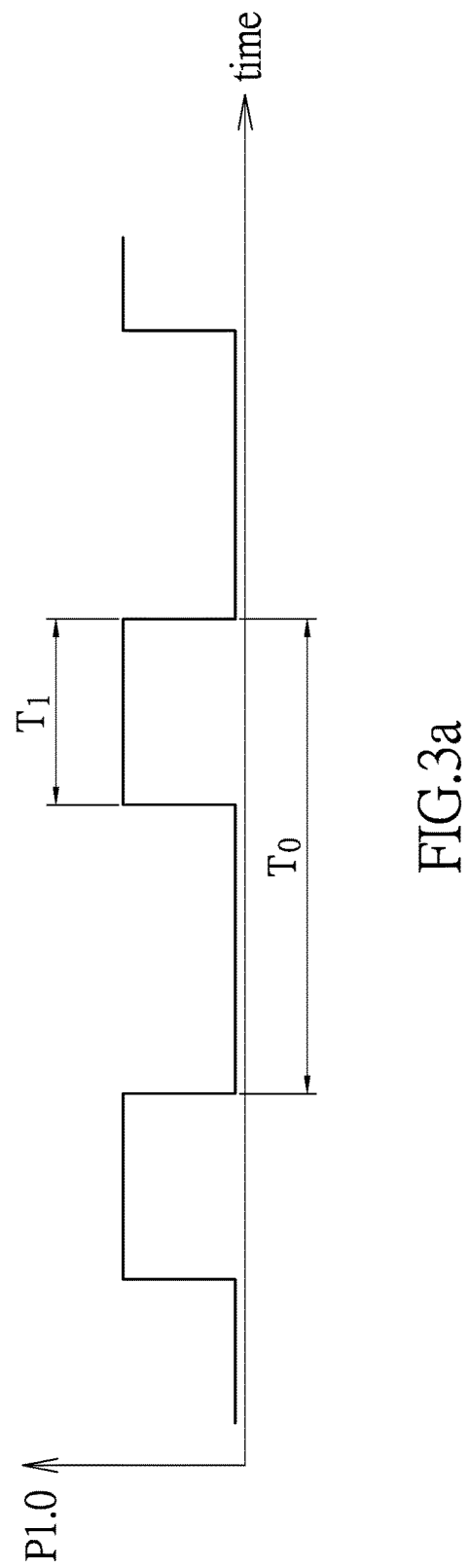
FIG. 3a schematically shows a PWM signal for controlling the conduction state of the unidirectional controllable switching unit in the circuit diagram of FIG. 3.

Referring to FIG. 3, the NMOS transistor M 35 has its drain connected to the LED module 36 and its gate connected with one pin P1.0 of the microcontroller 22'. The microcontroller generates with program codes in response to the external control signals a series of pulse-width-modulation (PWM) signals at the pin P1.0. FIG. 3a represents the waveform of a PWM signal which has a low voltage and a high voltage within the period $T_o$, wherein the high voltage is characterized by a time length $T_1$. The ratio of $T_1$ to $T_o$, namely, $T_1/T_o$, is referred to as the duty cycle of the PWM signal. The PWM signal generated at the pin P1.0 is fed to the control gate of the unidirectional control switch 35, wherein the transistor M 35 is turned on during the time $T_1$ by the high voltage such that the conduction rate of the transistor M 35 is controlled by the PWM signal. The duty cycle of the PWM signal determines an average electric power transmitting to the LED module 36.

Referring to FIG. 3, when the lighting device 11 is in lifestyle mode performing the second stage illumination, the motion sensor activated single-level illumination is performed by the microcontroller 22' with program codes in response to the motion sensor 4, wherein a PWM signal of the maximum duty cycle is generated at the pin P1.0 and sent to the transistor M 35 for controlling a maximum average electric power transmitting to the LED module 36 so as to perform full-power illumination, and then after a short time period a zero voltage is generated at the pin P1.0 to shut down the LED module 36; the motion sensor activated two-level illumination is performed by generating a PWM signal of the maximum duty cycle for the full-power illumination and then a PWM signal of small duty cycle for the low-power illumination.

Refer to FIG. 3 and FIG. 3a. In the lifestyle mode, when the lighting device 11 is activated by the motion sensor to perform single-level or two-level illuminations, the microcontroller 22' can be further controlled by an additional external control signal to enter a subroutine to continuously vary the duty cycle of the PWM signal, for instance by continuously varying the time length $T_1$ of the PWM signal in FIG. 3a, for controlling the controllable switching unit 35 to transmit a continuously varying average electric power to the light source load 36, such that during the varying process the luminance of the lighting device 11 increases slowly in intensity until a full-power illumination, what is referred to as soft on, and, after a short time interval, the luminance of the lighting device 11 decreases slowly in intensity to end the motion sensor activated cycle, what is referred to as soft off.

Figure 4:
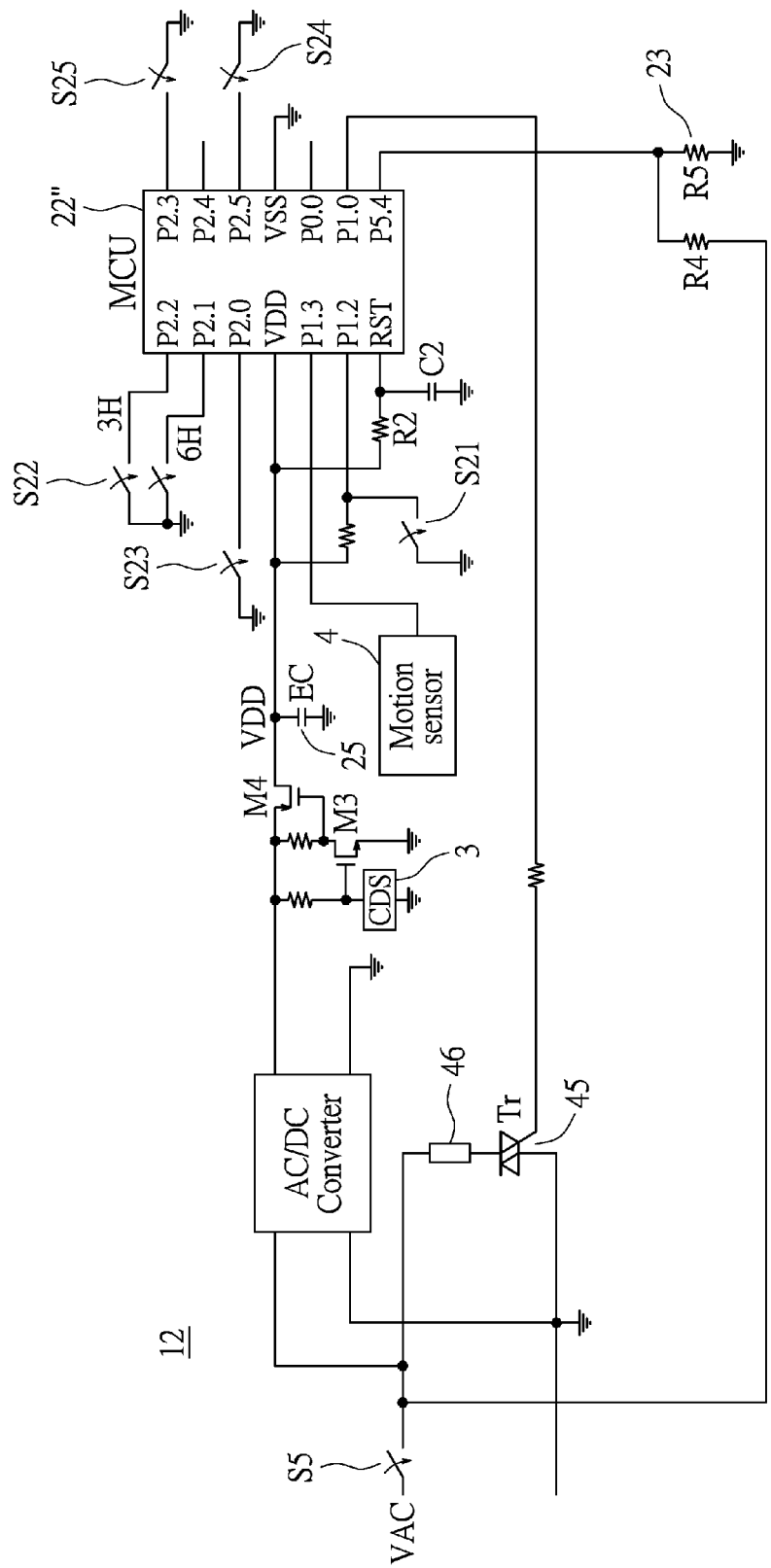
FIG. 4 schematically shows a circuit diagram depicting the lighting device to perform lifestyle lighting by controlling the conduction state of a bidirectional controllable switching unit according to an embodiment of the present invention.
Figure 4A:
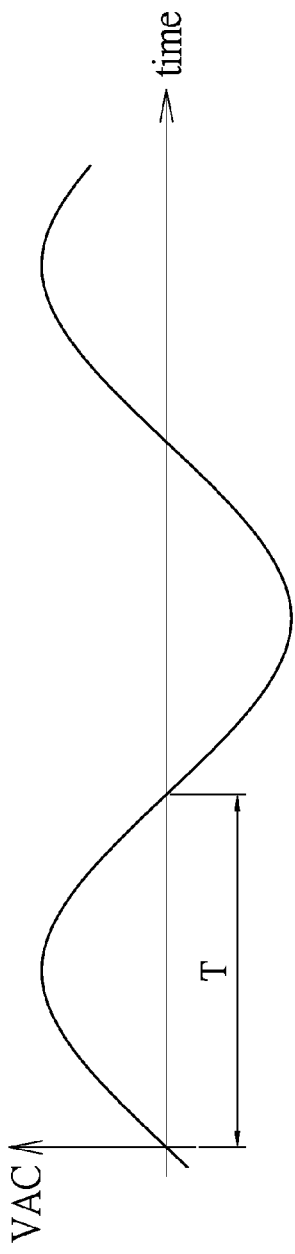
FIG. 4a, FIG. 4b and FIG. 4c schematically show voltage signals for controlling the conduction state of the bidirectional controllable switching unit and the AC electric power transmitting to a light source load in the circuit diagram of FIG. 4.

Refer to FIG. 4. According to an embodiment of the present disclosure, the lighting device 12 has a light source load 46 connected in series with a triac Tr 45 and an AC power. Comparing with the lighting device 11 as depicted in FIG. 3, the triac Tr 45 is a bidirectional controllable switching unit. The light source load 46 can be a halogen lamp, an incandescent lamp, a fluorescent lamp, an AC LED module or a LED bulb. Besides the difference in the controllable switching unit 45, the lighting device 12 adopts the same controller structure as shown in FIG. 2 and FIG. 3. In FIG. 4, the microcontroller 22" runs programs in response to the external control signals or trigger signals generated from the external control means S21-S25, 23, S5 in the same manner as described for the embodiments depicted in FIG. 2 and FIG. 3, wherein the lighting device 12 performs respectively dusk-dawn mode and lifestyle mode, depending on the external control signal generated from the control means S21.

Referring to FIG. 4, the microcontroller 22" has a pin P1.0 connected to a control gate of the bidirectional controllable switching unit 45 to control its conduction state for transmitting AC electric power to the light source load 46. The voltage divider 23, with its output connected to the pin P5.4 of the microcontroller 22", can serve both as the sampling circuit for the anytime setting and also as a zero-crossing-point detector. The anytime setting is done by operating the power switch S5 to generate a zero voltage for a time duration in second range at the pin P5.4, which is detected by the microcontroller 22 and interpreted as the anytime setting signal. As a zero-crossing-point detector the microcontroller 22" receives constantly at the pin P5.4 a zero-crossing signal in millisecond range synchronized with the AC power.

To elucidate the use of the zero-crossing-point detector and the principle of controlling the bidirectional controllable switching unit, in accompanying FIG. 4, FIG. 4a, FIG. 4b and FIG. 4c represent respectively the waveforms of (a) AC power signal, (b) the phase-angle control signal at the pin P1.0 and (c) the voltage signal across the two terminals of the light source load 46. Referring to the waveforms in FIG. 4a and FIG. 4b, the microcontroller 22" detects with the help of the zero-crossing-point detector 23 constantly at the pin P5.4 a zero-crossing signal, not shown here, in each half period T of the sinusoidal AC power, and generates with its program codes a square wave in FIG. 4b at the pin P1.0 which is synchronized with the AC power in FIG. 4a and serves as phase-angle control signal. The square wave in FIG. 4b has its front edge lagging behind the zero-crossing point of the AC power in FIG. 4a. Referring to the waveforms in FIG. 4b and FIG. 4c, the phase-angle control signal at P1.0 triggers at its front edge the triac 45 into conduction, wherein during the conductive period of the triac 45 a voltage signal of the duration $t_{on}$ appears at the two terminals of the light source load 46 such that an average electric AC power in proportion to the time duration $t_{on}$ is transmitted to the light source load 46.

Referring to FIG. 4, in conjunction with the zero-crossing-point detector 23, the microcontroller 22" generates in response to the external control signals different phase-angle control signals at the pin P1.0 with different time lags behind the zero-crossing point, so as to control different conductive phase angles of the triac Tr 45 to respectively transmit full power, small power and no power to the light source load 46, such that the lighting device 12 performs full-power illumination, low-power illumination and darkness, respectively.

Referring to FIG. 4, FIG. 4a, FIG. 4b and FIG. 4c, when the lighting device 12 performs single-level or two-level motion sensor activated illuminations, the microcontroller 22" can be further controlled by additional external control signal to enter a subroutine of the program codes to slowly change the conductive duration of the controllable switching unit 45. The microcontroller 22" with program codes generates phase-angle control signals in FIG. 4b with its front edge shifting continuously with time to continuously vary the conductive phase angle of the triac Tr 45, such that a continuously varying AC electric power, which results from a continuously varying conductive duration $t_{on}$ of the triac Tr 45, is transmitted to the light source load 46, wherein, during the varying process, the illumination of the lighting device 12 increases slowly in brightness till a full-power level (soft on) and after a short time interval decreases slowly in brightness to end the motion sensor activated cycle(soft off).

Figure 4B:
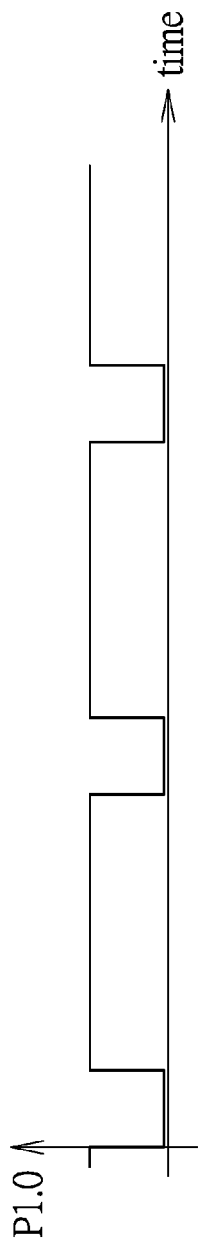
Figure 4C:
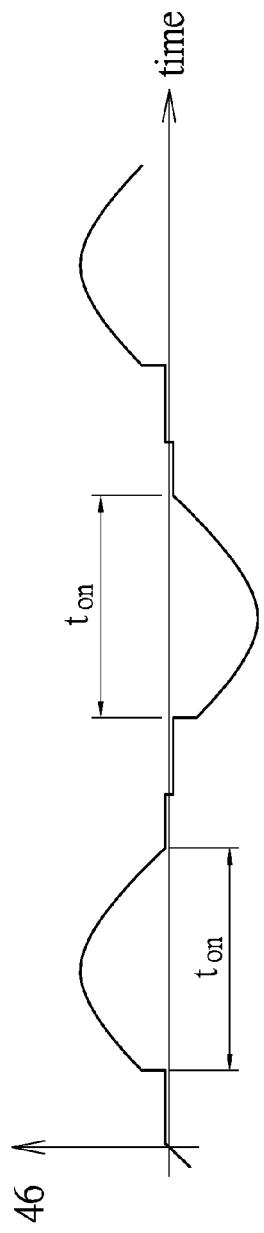

The use of PWM signal and phase-angle control signal, as depicted respectively in FIG. 3a and in FIG. 4b, to vary or to dim the luminance of light source load, offers many variations in controlling luminance level of the lifestyle lighting device, which can be done simply by modifying the program codes of the microcontroller without changing the circuit hardware as disclosed in embodiments depicted in FIGS. 3-4. When the lighting devices performs motion sensor activated two-level illumination, the luminance intensity of the low-power illumination can be further adjusted by using additional external control signal to control the microcontroller to run a corresponding subroutine.

The lighting device according to various embodiments of the present invention relies on the operation of external control means to generate external control signals. To facilitate the operation of the external control means, user-oriented construction of the external control means is required, wherein the external control means can be composed of push button, toggle switch, infrared ray sensor or similar means which generates constant voltage or binary signal with a low and a high voltage readable by the microcontroller and interpreted as the external control signal to execute a corresponding subprogram in the microcontroller. Furthermore, the binary signal can be a square waveform, for instance, with a small width for low voltage, referred to as short-zero control signal, or with a large width for low voltage, referred to as long-zero control signal. The use of binary signal in form of short-zero and long-zero can facilitate the selection of different working functions designed in the lighting device.

Figure 5:
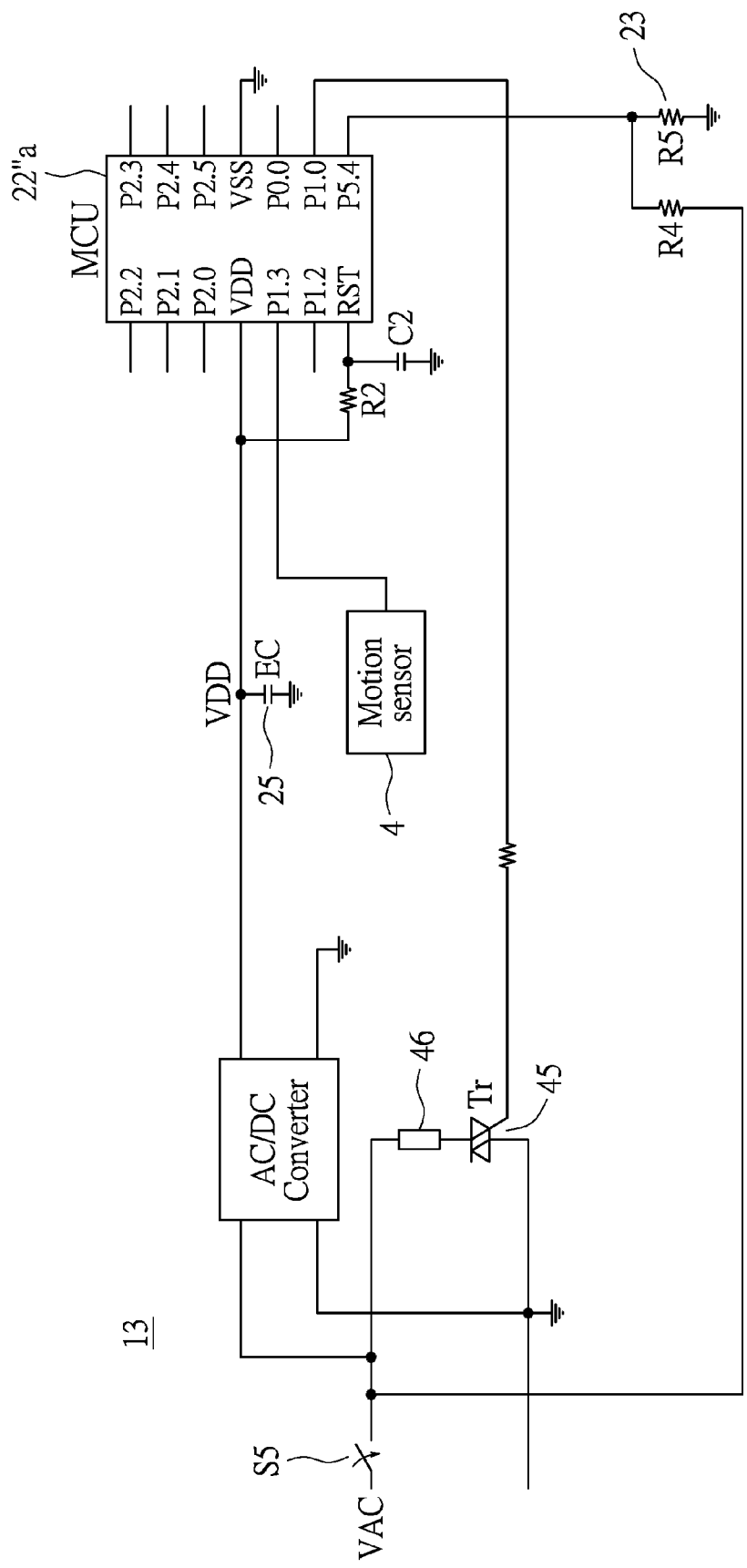
FIG. 5 schematically shows a circuit diagram depicting a variation in construction of a lighting device with lifestyle solution.

Based on the operation principle depicted in FIG. 1, there are many possibilities to implement lifestyle solution. In accompanying FIG. 4, FIG. 5 shows schematically a circuit diagram that is in fact a variation derived from FIG. 4, wherein the photo sensor CDS 3 and the external control means S21-S25 are removed, with the exception that the main power switch S5 is reserved for some technical applications. In FIG. 5, the luminance of the single light source load 46 is basically controlled by different conductive phase angles of the triac Tr 45 with method as described for the circuit diagram in FIG. 4. Comparing with the circuit of FIG. 4, the circuit depicted in FIG. 5 has some features deserved to be mentioned here. Referring to FIG. 5, the lighting device 13 can be so constructed that it has a microcontroller 22"a with program codes to control its illumination, for instance, to perform a general illumination mode and a lifestyle mode respectively by operating the power switch S5. The general lighting mode is related to a usual on/off operation of the switch S5, such that with the switch S5 being turned on, the lighting device 13 illuminates with full power; while with the switch S5 being turned off, the lighting device 13 shuts off completely. To be distinguishable from the general illumination mode, the lifestyle mode is selected, for instance, by momentary turning off and turning back on the switch S5 within a preset instant time period, such as 1-2 seconds. If the microcontroller 22"a with program codes detects this on-off-on operation sequence through the pin P5.4 connected to the voltage divider 23, the microcontroller 22"a runs a corresponding subroutine for performing the lifestyle mode, wherein the lighting device 13 performs a full-power illumination for a short time period, for instance, a period of five minutes, and then is converted to a single-level or a two-level illumination activated by the motion sensor 4. The simple circuit construction in FIG. 5 eliminates timer settings and various functional selections.

The lighting device 13, as depicted in FIG. 5, can be used for general illumination in house. It is even more favorable to design the lifestyle mode by combining the aforementioned soft on and soft off techniques to the single-level or two-level illumination activated by motion sensor. With such a lighting device 13, the house owner before sleeping can simply operate the wall switch S5 by on-off-on actions to select the lifestyle mode; the lighting device 13 illuminates with full power for a short time period and then enters a standby power-saving status to await the detection signal from the motion sensor 4. If the house owner wakes up sometimes in the middle of the night, the soft on illumination activated by the motion sensor 4, wherein, instead of a sudden glaring brightness, the luminance intensity of the lighting device increases gradually, can make him feeling comfortable as he moves through a dark space. The lighting device is automatically turned off softly or switched gradually to a low level illumination after the house owner goes back to sleep. The circuit sketched in FIG. 5 provides therefore a simple and practical lifestyle solution without the use of photo sensor.

To make the lighting device of the present invention even more user friendly, additional lifestyle solution is provided for different time or on different occasions. A preferable solution is for example to build a multi-mode lighting device to perform two or three working modes merging into one single lighting device based on microcontroller technology, wherein the user can select one of the multi-modes for performance by using an external control signal to alternately change the working mode or using external control signals of different binary patterns to activate corresponding working modes. The multi-modes always includes a basic general illumination mode (with or without photo sensor) coupled with the above mentioned lifestyle security modes for user's selection.

To extend the lifestyle solutions based on the circuit diagram depicted in FIG. 5, in which the lighting device 13 consists of a motion sensor 4, a microcontroller 22"*a* and a plurality of external control means not shown in FIG. 5, the program codes of the microcontroller 22"*a* can be further modified to realize the automatic on/off function of the photo sensor such that the lighting device 13 is automatically turned on at dusk and turned off at dawn by the program codes of the microcontroller 22"*a*, wherein during the course of nighttime the lighting device 13 has at least two working modes selectable by the users. In order to perform the aforementioned lifestyle mode without using photo sensor, an initial setting process is taken by the users to input at least three time parameters, namely a first preset time point to turn on the lighting device for a full-power illumination, a second preset time point to convert to a power-saving/security illumination which is activated by the motion sensor and a third preset time point to turn off the lighting device and at the same time to reset the microcontroller for the next 24-hour performance cycle. The users based on their living habits operate corresponding external control means to generate at least three triggering signals to the microcontroller respectively at three time points representing the time to turn on for a full-power illumination, the time to convert to a power-saving illumination and the time to turn off the lighting device. Upon receiving the three triggering signals generated by the users, the microcontroller with program codes is able to store the time point information and thereby establish the working procedures to perform the lifestyle illumination mode on a 24-hour repetitive basis until new triggering signals are given by the user to change the time point parameters to establish a new lifestyle illumination mode. Such lifestyle mode without reliance on a photo sensor enables the users to manage their time table of lighting performance for both indoor and outdoor applications in a more flexible, more friendly and more energy saving ways.

The automatic on/off lighting device control based on the program codes of the microcontroller also helps to improve home security from the perspective of antitheft consideration. When the home owners are away for business trip or vacation for a longer period of time, say a week, if the houses are always dark or lit during the night time, for instance, the lighting device is automatically turned on and turned off by a photo sensor, it gives the intruder or thief a strong signal that the owners are out for a long trip and it is a good time to break in. On the contrary, the use of microcontroller to replace photo sensor for lighting control offers great flexibility to program a dynamically timed illumination, for instance, by adding an instant drop of illumination followed by a shorter time period of full-power illumination, say 1 to 10 minutes, till the second preset time point of conversion at which the lighting device being switched to a power-saving illumination. The temporary drop of illumination for a couple seconds serves as remind signal telling the users it is time to rest and the short extension of full illumination simply gives the user ample time to wrap up for sleeping. If the user wants to manage the third preset time point precisely according to his or her living need, the above initial setting process for inputting three preset time points is needed. However from a practical consideration and given the fact that human being living habit is used to 6-8 hours sleep it may just be good enough to build into the program codes with an eight hours time delay to perform the energy saving/security mode on an automatic basis. Thus, after 8 hours from the second preset time point for conversion of power-saving illumination, or alternatively 12 hours from the power on time point, the microcontroller with program codes will turn off the light and reset for the next operating cycle.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A lighting control device for managing night illumination of a lighting load comprising:
   at least one controllable semiconductor switching element, electrically connected between the lighting load and a power source;
   a motion sensor, for detecting a motion intrusion to activate the lighting load;
   at least one external control unit for controlling lighting performances of the lighting load; and
   a controller, electrically coupled to the controllable semiconductor switching element and the external control unit;
   wherein the controller outputs a control signal to control a conduction rate of the controllable semiconductor switching element to transmit different electric powers to the lighting load to generate illuminations with different illumination levels;
   wherein the external control unit generates at least an external control signal being read and interpreted to the controller for performing a lifestyle lighting solution;
   wherein upon receiving the external control signal the controller operates to activate a corresponding subroutine to establish at least two preset operating time points to divide a daily 24-hour cycle period into at least two operating time domains for performing different illumination modes;
   wherein a first operating time domain starts from a first preset operating time point to a second preset operating time point and a second operating time domain starts from the second preset operating time point to the next first preset operating time point to complete the 24-hour operating cycle period;
   wherein during the first operating time domain the controller operates to perform a first illumination mode;
   wherein during the second operating time domain the controller operates to perform a second illumination mode;
   wherein the first illumination mode is an user friendly illumination mode;
   wherein the first illumination mode begins with an illumination state of either being a turned off state or a low level state;
   wherein when a motion intrusion is detected by the motion sensor during the first operating time domain, an illumination level of the lighting load is slowly increased to a first illumination level over a first predetermined time interval, a soft on process, and then continues for a first predetermined time period, wherein upon a maturity of the first predetermined time period and in the absence of further motion detected, the lighting load is switched back to perform the turned off state or the low level state;

wherein the first illumination mode ends at the second preset operating time point and the lighting load is turned into a second illumination mode;
wherein the second illumination mode is a regular illumination mode;
wherein the lighting load is either in the turned off state or the low level state, wherein when the motion intrusion is detected by the motion sensor, the illumination level of the lighting load is instantly increased to a second illumination level for a second predetermined time period, wherein upon the maturity of the second predetermined time period and in the absence of further motion detected, the lighting load is switched back to the turned off state or the low level state;
wherein the second illumination mode ends at the next first preset operating time point for a repetitive performance to complete the 24-hour operating cycle period;
wherein the second illumination level is equal to or higher than the first illumination level;
wherein the soft on process of the first illumination mode is designed with a purpose of avoiding or mitigating a hardship of an eye-irritating effect caused by a sudden switch on of a bright environment thru a slow on process;
wherein the motion sensor is a passive infrared ray motion sensing device, an ultrasonic motion sensing device or a microwave motion sensing device.

2. The lighting control device according to claim 1, wherein the soft on process of the first illumination mode is further enhanced with a two-stage approach; wherein when a turn on process is performed, the controller with program codes operates to increase the illumination level of the lighting load to a partial level of the first illumination level with a minimum eye-irritating effect for a partial time length of the first predetermined time interval and then followed by a slow process to gradually increase the illumination level continuously or stepwise thru the end of the first predetermined time interval till reaching the first illumination level.

3. The lighting control device according to claim 1, wherein the illumination level of the first illumination level is adjusted according to the user's lifestyle.

4. The lighting control device according to claim 1, wherein the time length of the first predetermined time period is adjusted according to the user's lifestyle.

5. The lighting control device according to claim 1, wherein the time length of the first predetermined time interval is adjusted according to the user's lifestyle.

6. The lighting control device according to claim 1, wherein the illumination level of the low level state is adjusted according to the user's lifestyle.

7. The lighting control device according to claim 1, wherein the first preset operating time point is set with an anytime setting method; wherein the user selects a spot time point or a preprogrammed forward time point to be the first preset operating time point, wherein when the controller receives a trigger signal generated by the external control unit, the controller operates to activate an anytime point subroutine to establish the first preset operating time point in the memory of the controller for executing a 24-hour recurring program to manage the performance of the LED light load to automatically convert from the regular illumination mode to the user friendly illumination mode on a daily repetitive basis at each 24-hour cycle point starting from an initial performance of the first illumination mode upon activation of the preset operating time point.

8. The lighting control device according to claim 7, wherein the preprogrammed forward time point for setting the preset operating time point is implemented by a programming timer incorporated with the external control unit, wherein the programming timer allows the user to select a time delay or a clock time point for activating the first preset operating time point to operate the 24-hour recurring program.

9. The lighting control device according to claim 8, wherein the first preset operating time point is a clock time point; wherein the user may decide a desired clock time point to be the preset operating time point and select a corresponding time length to set the time delay with the programming timer, wherein the time length of the time delay is the difference between the desired clock time point and the current clock time point.

10. The lighting control device according to claim 7, wherein the trigger signal for setting the preset operating time point is a short power interruption signal.

11. The lighting control device according to claim 10, wherein the short power interruption signal received by the controller is generated by turning off and turning back on a power switch electrically coupled to the controller within a predetermined short time duration.

12. The lighting control device according to claim 7, wherein the trigger signal received by the controller is generated by pushing a push button or pressing a touch pad configured in the external control unit electrically coupled to the controller for a short time duration.

13. The lighting control device according to claim 1, wherein the second preset operating time point is automatically set by programming a time delay following a setting of the first preset operating time point to be the second preset time point, wherein the time length of the time delay corresponds to at least the time length of sleeping hours of the user.

14. The lighting control device according to claim 13, wherein the time length of time delay for setting the second preset operating time point is adjusted according to the user's lifestyle.

15. The lighting control device according to claim 13, wherein the time length of time delay for setting the second preset operating time point is set by an adjusting timer configured in the external control unit.

16. The lighting control device according to claim 1, wherein the external control signal for setting the first preset operating time point and the second preset operating time point is a grounding signal with a time length generated thru operating a push button or a touch pad configured in the external control unit.

17. The lighting control device according to claim 1, wherein the external control unit is configured with at least a push button switch, a toggle switch, a rocker switch, a touch sensor, a photo sensor, an infrared ray sensor or a wireless control device being programmed with the controller for setting the preset operating time points or for adjusting performance function of the lighting control device.

18. The lighting control device according to claim 17 wherein the wireless control device is electrically coupled to the controller, wherein the wireless control device receives a wireless control signal and converts the wireless control signal into the external control signal being read and interpreted to the controller.

19. The lighting control device according to claim 18, wherein the wireless control device is a Wi - Fi wireless control signal receiver, a Blue Tooth wireless control signal receiver, a Zig Bee wireless control signal receiver or a RF wireless control signal receiver.

20. The lighting control device according to claim 18 wherein the wireless control signal is received from a mobile phone, a mobile communication device with an application program preloaded (APP) or an artificial intelligence based voice commanding device to interpret and convert human language instruction(s) into the wireless external control signal being read and interpreted to the controller for setting at least one operating parameter which being the two preset operating time points, the time length of the first predetermined time period, the time length of the second predetermined time period, the time length of the first time interval, the time length of the second time interval and the partial level of the first illumination level.

21. The lighting control device according to claim 20, wherein the wireless external control signal received from the mobile phone, the mobile communication device or the voice commanding device includes a clock time information to enable the controller to set the first operating time point and the second operating time point on a clock time basis.

22. The lighting control device according to claim 1, wherein when operating the first illumination mode the controller operates to activate a first subroutine to continuously increase a duty cycle of a pulse width modulation signal to implement the soft on process.

23. The lighting control device according to claim 1, wherein the lighting control device is configured with a wall switch electrically coupled with a remote lighting apparatus for controlling a lighting performance of the remote lighting device.

24. A lighting control device for managing an illumination performance of a lighting load, comprising:
at least one controllable semiconductor switching element, electrically coupled between the lighting load and the power source;
at least two external control units including a first external control unit and a second external control unit; and
a controller, electrically coupled to the controllable semiconductor switching element, the first external control unit and the second external control unit;
wherein the controller controls a conduction rate of the controllable semiconductor switching element to transmit different electric powers to the lighting load to generate illuminations with different illumination levels;
wherein the first external control unit generates a first external control signal being read and interpreted to the controller to activate a lifestyle lighting management subroutine programmed in the controller;
wherein the second external control unit generates at least a second external control signal for controlling on/off performance or adjusting an illumination level of the lighting load;
wherein upon receiving the first external control signal the controller operates to activate the lifestyle subroutine to establish at least two preset operating time points to divide a daily 24-hour cycle period into at least two operating time domains for performing different illumination modes;
wherein a first operating time domain starts from a first preset operating time point to a second preset operating time point and a second operating time domain starts from the second preset operating time point to the next first preset operating time point to complete the 24-hour operating cycle period;
wherein during the first operating time domain the controller operates to perform a first illumination mode;
wherein during the second operating time domain the controller operates to perform a second illumination mode;
wherein the first illumination mode is a soft on illumination mode with an arrangement that whenever a switch on process is operated by the second external control unit, the lighting control device manages to slowly increase an illumination level of the lighting load from a turned off state or from a low level state to a first high illumination level over a first predetermined time interval, soft on process;
wherein whenever a switch off process is operated with the second external control unit, the lighting control device manages to slowly reduce the illumination level of the lighting load to the low level state or to the turned off state over a second predetermined time interval, a soft off process;
wherein the second illumination mode is a quick-on illumination mode with an arrangement that whenever the lighting load is switched on with the second external control unit, the controller manages to quickly increase the illumination level of the lighting load from a turned off state or from a low level state to a second high illumination level over a third predetermined time interval;
wherein when the switch off process is operated with the second external control unit, the controller manages to slowly decrease the illumination level of the lighting load to the low level state or to the turned off state over a fourth predetermined time interval, the soft off process;
wherein the time length of the third predetermined time interval ranges from zero to a value lower than the time length of the first predetermined time interval;
wherein the soft on process is an user friendly illumination arrangement designed with a purpose of avoiding or mitigating a hardship of an eye irritating effect by a sudden turn on of a bright illumination till the user's eyes become accustomed to the bright illumination;
wherein the soft off process is designed with the purpose of providing a delay shut off illumination solution to help the user walking thru another destination with a safety illumination arrangement.

25. The lighting control device according to claim 24, wherein the soft on process is managed with a two-stage approach; wherein when the switch on process is operated, the controller with program codes operates to increase the illumination level of the lighting load to a partial level of the first high illumination level with a minimum eye-irritating effect for a partial time length of the first predetermined time interval and then followed by a slow process to gradually increase the illumination level continuously or stepwise thru the end of the first predetermined time interval till reaching the first high illumination level.

26. The lighting control device according to claim 24, wherein the soft off process is managed with a two-stage approach; wherein when the switch off process is operated during the first illumination mode or the second illumination mode, the controller with program codes manages to turn off the lighting load in two stages; wherein for the first stage the controller operates to instantly reduce the illumination level of the lighting load to a partial level of the second illumination level and continues such reduced second illumination level for a partial time length of the second predetermined time interval or the fourth predetermined time interval followed by the second stage to gradually turn off the illumination level of the lighting load thru the end of the second predetermined time interval or the end of the fourth predetermined time interval.

27. The lighting control device according to claim 24, wherein the time length of the first predetermined time interval for operating the soft on process in the first illumination mode, the time length of the second predetermined time interval for operating the soft off process in the first illumination mode and the time length of the fourth predetermined time interval for operating the soft off process are respectively adjusted by the external control unit according to the user's lifestyle.

28. The lighting control device according to claim 24, wherein the illumination level of the first high illumination level is further adjusted according to the user's lifestyle.

29. The lighting control device according to claim 24, wherein the illumination level of the low level state is further adjusted according to the user's lifestyle.

30. The lighting control device according to claim 24, wherein the first preset operating time point is set with an any time setting method; wherein the user may select a spot time point or a preprogrammed forward time point to be the first preset operating time point by operating the first external control unit to generate and deliver a trigger signal to the controller, wherein the controller upon receiving the trigger signal manages to establish the first preset operating time point in the memory of the controller and operates to perform the first illumination mode according to a selected time schedule of the preset operating time point to perform a 24-hour recurring subroutine until a new trigger signal is received for updating the first preset operating time point.

31. The lighting control device according to claim 30, wherein the preprogrammed forward time point for setting the first preset operating time point is implemented by an adjusting timer incorporated with the first external control unit, wherein the adjusting timer allows the user to select a time delay or a clock time point for activating the preset operating time point to perform the first illumination mode on a 24-hour recurring basis.

32. The lighting control device according to claim 31, wherein the forward time point for establishing the first preset operating time point is a clock time point; wherein the user decides a desired clock time point to be the first preset operating time point and select a corresponding time length to set the time delay with the adjusting timer, wherein the time length of time delay is a difference between the desired clock time point and the present clock time point.

33. The lighting control device according to claim 30, wherein the trigger signal for setting the first preset operating time point is a short power interruption signal.

34. The lighting control device according to claim 33, wherein the trigger signal received by the controller is generated by instantly turning off and turning back on a power switch configured in the first external control unit electrically coupled to the controller.

35. The lighting control device according to claim 33 wherein the trigger signal received by the controller is generated by pushing a push button or pressing a touch pad configured in the external control unit electrically coupled to the controller for a short time duration.

36. The lighting control device according to claim 24, wherein the second preset operating time point is automatically set by programming a delay timer following a setting of the first preset operating time point, wherein the time length set by the delay timer corresponds to at least the time length of sleeping hours of the user.

37. The lighting control device according to claim 24, wherein the external control signal for setting the first preset operating time point and the second preset operating time point is a grounding signal with a time length generated thru operating a push button or a touch pad configured in the first external control unit.

38. The lighting control device according to claim 24, wherein the first external control unit and the second external control unit are respectively configured with at least a push button switch, a toggle switch, a rocker switch, a touch sensor, a photo sensor, an infrared ray sensor or a wireless control device being programmed with the controller for setting the preset operating time points or for operating performances of the lighting load.

39. The lighting control device according to claim 38, wherein the wireless control device is electrically coupled to the controller, wherein the wireless control device receives a wireless control signal and converts the wireless control signal into the external control signal being read and interpreted to the controller.

40. The lighting control device according to claim 39, wherein the wireless control device is a Wi-Fi wireless control signal receiver, a Blue Tooth wireless control signal receiver, a Zig Bee wireless control signal receiver or a RF wireless control signal receiver.

41. The lighting control device according to claim 39, wherein the wireless control signal is received from a mobile phone, a mobile communication device with an application program preloaded (APP) or an artificial intelligence based voice commanding device with an application program preloaded (APP) to interpret and convert human language instruction into the wireless external control signal being read and interpreted to the controller for setting at least an operating parameter which being the two preset operating time points, the time length of the first predetermined time interval, the time length of the second predetermined time interval and the partial level of the first illumination level.

42. The lighting control device according to claim 24, wherein when operating the switch on process in the first illumination mode the controller operates to continuously increase conduction period of a duty cycle of a pulse width modulation signal to implement the soft on process, wherein when operating the switch off process of the first illumination mode the controller operates to continuously decrease the conduction period of the duty cycle of the pulse width modulation signal to implement the soft off process.

43. The lighting control device according to claim 24, wherein the lighting control device is configured with a wall switch electrically coupled with a remote lighting apparatus for controlling a lighting performance of the remote lighting device.

44. An illumination control device for managing an illumination performance of a lighting load, comprising:
  at least one controllable semiconductor switching element, electrically connected between the lighting load and a power source;
  at least two external control units; and
  a controller, electrically coupled to the controllable semiconductor switching element and the two external control units;
  wherein the controller controls a conduction rate of the controllable semiconductor switching element to transmit different electric powers to the lighting load to generate illuminations with different illumination levels;

wherein a first external control unit generates a first external control signal being read and interpreted to the controller to activate a first subroutine for performing a first illumination mode;

wherein a second external control unit generates a second external control signal being read and interpreted to the controller to activate a second subroutine for performing a second illumination mode;

wherein the first illumination mode is a lifestyle illumination mode with an arrangement that whenever a switch on process is operated with the first external control unit, the lighting control device manages to slowly increase an illumination level of the lighting load from a turned off state or from a low level state to a first high illumination level over a first predetermined time interval, soft on process;

wherein whenever a switch off process is operated, the lighting control device manages to slowly reduce the illumination level to the low level state or to the turned off state over a second predetermined time interval, a soft off process;

wherein the second illumination mode is a quick-on illumination mode with an arrangement that whenever the switch on process is operated with the second external control unit, the lighting control device manages to quickly increase the illumination level of the lighting load from a turned off state or from a low level state to a second high illumination level over a third predetermined time interval;

wherein whenever the switch off process is operated the lighting control device manages to slowly decrease the illumination level of the lighting load to the low level state or to the turned off state over a fourth predetermined time interval, the soft off process;

wherein the time length of the third predetermined time interval ranges from zero to a value lower than the time length of the first predetermined time interval;

wherein the soft on process is an user friendly illumination arrangement designed with a purpose of avoiding or mitigating a hardship of an eye irritating effect by a sudden turn on of a bright illumination till the user's eyes become accustomed to the bright illumination;

wherein the soft off process is designed with the purpose of providing a delay shut off illumination solution to help the user walking to another destination with a safety illumination arrangement.

45. The illumination control device according to claim 44, wherein the first external control unit is configured with a push button, a touch pad, a toggle switch or a rocker switch electrically connected to the controller, wherein when the push button, the touch pad, the toggle switch or the rocker switch is operated, the controller operates to activate the first subroutine to perform the first illumination mode.

46. The illumination control device according to claim 44, wherein the second external control unit is configured with a push button, a touch pad, a toggle switch or a rocker switch electrically connected to the controller, wherein when the push button, the touch pad, the toggle switch or the rocker switch is operated, the controller operates to activate a second subroutine to perform the second illumination mode.

47. The illumination control device according to claim 44, wherein the soft on process is further enhanced with a two-stage approach; wherein when the switch on process is operated, the controller with program codes operates to increase the illumination level of the lighting load to a partial level of the first high illumination level with a minimum eye-irritating effect for a partial time length of the first predetermined time interval and then followed by a slow process to gradually increase the illumination level continuously or stepwise thru the end of the first predetermined time interval till reaching the first high illumination level.

48. The illumination control device according to claim 44, wherein the soft off process is managed with a two-stage approach; wherein when the switch off process is operated during the first illumination mode or the second illumination mode, the controller with program codes manages to turn off the lighting load in two stages; wherein for the first stage the controller operates to instantly reduce the illumination level of the lighting load to a partial level of the second illumination level and continues such reduced second illumination level for a partial time length of the second predetermined time interval or the fourth predetermined time interval followed by the second stage to gradually turn off the illumination level of the lighting load thru the end of the second predetermined time interval or the end of the fourth predetermined time interval.

49. The illumination control device according to claim 44, wherein the first predetermined time interval for operating the soft on process of the first illumination mode, the second predetermined time interval for operating the soft off process of the first illumination mode and the fourth predetermined time interval for operating the soft off process of the second illumination mode are respectively adjusted by the external control unit according to the user's lifestyle.

50. The illumination control device according to claim 44, wherein the illumination level of the first high illumination level is further adjusted according to the user's lifestyle.

51. The illumination control device according to claim 44, wherein illumination level of the low level state is further adjusted according to the user's lifestyle.

52. The illumination control device according to claim 44, wherein the lighting control device further comprises a third external control unit electrically connected to the controller for controlling a dimming performance of the connected lighting load.

53. A lifestyle security light, comprising:
- a light emitting unit, including an LED light load;
- a controllable semiconductor switching device, electrically connected between the LED light load and a power source;
- a photo sensor, for automatically enabling the operation of the lifestyle security light at nightfall and disabling the operation of the lifestyle security light at daybreak;
- a motion sensor, for detecting a motion intrusion;
- at least an external control device, for generating an external control signal; and
- a controller, electrically coupled with the controllable semiconductor switching device, the external control device and the motion sensor;
- wherein the controller with program codes outputs a control signal to control a conduction rate of the controllable semiconductor switching device in each duty cycle of the power source for delivering different average electric powers to the LED light load for generating illuminations with different illumination levels;
- wherein the controller controls the controllable semiconductor switching device to perform at least three illumination modes including a first illumination mode, a second illumination mode and a third illumination mode to characterize a lighting solution of the lifestyle security light;
- wherein the first illumination mode is a lifestyle general illumination mode, the second illumination mode is an energy saving illumination mode and the third illumination mode is a motion activated illumination mode;

wherein the first illumination mode is activated by the photo sensor and controlled by the controller, wherein the second illumination mode is activated by the control signal received from the external control device and controlled by the controller, wherein the third illumination mode is activated by the motion sensor and controlled by the controller;

wherein at dusk when an ambient light detected by the photo sensor is lower than a first predetermined value, the LED light load is switched on and the motion sensor remains deactivated, the controller responsively operates to output a first control signal to control the conduction rate of the controllable semiconductor switching device to generate an illumination with a first illumination level for performing the first illumination mode;

wherein when the controller receives the external control signal generated by the external control device, the motion sensor is activated and the controller operates to output a second control signal to reduce the conduction rate of the controllable semiconductor switching device to generate an illumination with a second illumination level for performing the second illumination mode for a first predetermined time duration;

wherein when the controller receives the motion intrusion signal from the motion sensor, the controller operates to output a third control signal to increase the conduction rate of the controllable semiconductor switching device to generate an illumination with a third illumination level for performing the third illumination mode for a second predetermined time duration and then the controller manages to switch the lighting performance back to the second illumination mode, wherein the illumination level for performing the second illumination mode is lower than the illumination level for performing the third illumination mode; and wherein when the ambient light detected by the photo sensor is higher than a second predetermined value, the LED light load is consequently switched off.

54. The lifestyle security light according to claim 53, wherein the external control device operates a time setting method to select a preset operating time point to convert the lighting performance of the lifestyle security light from the first illumination mode to the second illumination mode.

55. The lifestyle security light according to claim 53, wherein the second illumination level is programmed at a zero level.

56. The lifestyle security light according to claim 54, wherein the time setting method is an anytime setting method; wherein the user selects a spot time point or a preprogrammed forward time point to be the preset operating time point, wherein when the controller receives a trigger signal, the controller operates to activate an anytime point subroutine to establish the preset operating time point in the memory of the controller for executing a 24-hour recurring program to manage the performance of the LED light load to automatically convert from the first illumination mode to the second illumination mode on a daily repetitive basis at each 24-hour cycle point counting from an initial performance of the first illumination mode upon activation of the preset operating time point.

57. The lifestyle security light according to claim 56, wherein the preprogrammed forward time point for setting the preset operating time point is implemented by a programming timer incorporated with the external control device, wherein the programming timer allows the user to select a time delay or a clock time point for activating the preset operating time point to operate the 24-hour recurring program.

58. The lifestyle security light according to claim 57, wherein the preset operating time point is a clock time point; wherein the user decides a desired clock time point to be the preset operating time point and select a corresponding time length to set the time delay with the programming timer, wherein the time length of the time delay is the difference between the desired clock time point and the current clock time point.

59. The lifestyle security light according to claim 56, wherein the trigger signal for setting the preset operating time point is a short power interruption signal.

60. The lifestyle security light according to claim 59, wherein the short power interruption signal received by the controller is generated by turning off and turning back on a power switch electrically coupled to the controller within a predetermined short time duration.

61. The lifestyle security light according to claim 59, wherein the trigger signal received by the controller is generated by pushing a push button or pressing a touch pad configured in the external control unit electrically connected to the controller for a short time duration.

62. The lifestyle security light according to claim 54, wherein the time setting method for setting the preset operating time point is a fixed time point setting method, wherein a timer embedded in the controller is programmed to automatically adjust and set the time duration of the first illumination mode according to a data base of seasonal time shift such that the security light is converted from the first illumination mode to second illumination mode at a fixed time point.

63. The lifestyle security light according to claim 54, wherein the time setting method for setting the preset operating time point is a fixed time period setting, wherein an adjusting timer configured in the external control device is programmed by the user to set a time length of the fixed time period for the LED light load to continuously perform the first illumination mode before being converted to the second illumination mode at the end of the fixed time period, wherein the time length of the fixed time period is counted from the time point when the photo sensor activates the security light to start performing the first illumination mode till the time point the LED light load is converted to the second illumination mode.

64. The lifestyle security light according to claim 63, wherein the time length of the fixed time period is adjusted according to the user's lifestyle.

65. The lifestyle security light according to claim 53, wherein the time length of the second predetermined time duration for performing the third illumination mode is adjusted according to user's lifestyle.

66. The lifestyle security light according to claim 53, wherein the time length of the first predetermined time duration for performing the second illumination mode is further adjusted according to the user's lifestyle, wherein the adjustment further includes a selection of an option with the illumination being ended at dawn according to a switch off signal received from the photo sensor.

67. The lifestyle security light according to claim 53, wherein the illumination level of the first illumination mode is further adjusted according to the user's lifestyle.

68. The lifestyle security light according to claim 53, wherein the illumination level of the second illumination mode is further adjusted according to the user's lifestyle.

69. The lifestyle security light according to claim 53, wherein the illumination level of the third illumination mode is further adjusted according to the user's lifestyle.

70. The lifestyle security light according to claim 64, wherein the time length of the fixed time period is programmed at zero such that the LED light load only performs the energy saving illumination mode and the motion activated illumination mode alternatively; wherein at dusk when an ambient light detected by the photo sensor is lower than a first predetermined value, the LED light load is switched on and the controller manages to have the LED light load perform the energy saving illumination mode with a low illumination level for a first predetermined time duration and at the same time the motion sensor is activated; wherein when the controller receives a motion intrusion signal, the controller manages to have the LED light load perform the motion activated illumination mode with a high illumination level for a second predetermined time duration before being switched back to the energy saving mode; wherein when the ambient light detected by the photo sensor is higher than a second predetermined value, the LED light load is consequently switched off.

\* \* \* \* \*